United States Patent
Ito et al.

(10) Patent No.: US 7,327,057 B2
(45) Date of Patent: Feb. 5, 2008

(54) NEUTRAL-POINT TERMINAL DEVICE FOR DYNAMOELECTRIC MACHINE

(75) Inventors: Wataru Ito, Mie-ken (JP); Motoyasu Mochizuki, Aichi-ken (JP); Yasuo Hirano, Mie-ken (JP); Akihito Kondo, Fuchu (JP); Yoichi Seo, Fuchu (JP); Takashi Hanai, Mie-ken (JP); Nobutaka Aikura, Mie-ken (JP); Takashi Araki, Mie-ken (JP); Masakatsu Matsubara, Mie-ken (JP); Toshio Innan, Mie-ken (JP)

(73) Assignees: Kabushiki Kaisha Toshiba, Tokyo (JP); Toshiba Industrial Products Manufacturing Corporation, Mie-gun (JP)

( * ) Notice: Subject to any disclaimer, the term of this patent is extended or adjusted under 35 U.S.C. 154(b) by 189 days.

(21) Appl. No.: 11/233,372

(22) Filed: Sep. 23, 2005

(65) Prior Publication Data

US 2006/0049704 A1    Mar. 9, 2006

(51) Int. Cl.
*H02K 11/00*    (2006.01)
(52) U.S. Cl. .......................... 310/71; 310/260
(58) Field of Classification Search ................ 310/71, 310/179, 260; 439/750; 174/88 R
See application file for complete search history.

(56) References Cited

U.S. PATENT DOCUMENTS

| | | | | |
|---|---|---|---|---|
| 2,932,685 A | * | 4/1960 | Raila et al. | ................ 174/84 C |
| 3,555,319 A | * | 1/1971 | Schaefer | ....................... 310/87 |
| 3,912,957 A | * | 10/1975 | Reynolds | ...................... 310/71 |
| 4,227,103 A | | 10/1980 | Humes, Jr. et al. | |
| 4,602,424 A | | 7/1986 | Kindig et al. | |
| 6,403,935 B2 | * | 6/2002 | Kochman et al. | ........... 219/545 |
| 6,737,772 B2 | * | 5/2004 | Tanaka et al. | ................ 310/71 |
| 6,791,228 B2 | | 9/2004 | Hashiba et al. | |
| 2001/0031585 A1 | * | 10/2001 | Murakami et al. | .......... 439/756 |
| 2003/0006657 A1 | * | 1/2003 | Mimura | ....................... 310/71 |

FOREIGN PATENT DOCUMENTS

| | | |
|---|---|---|
| JP | 63-265536 A | 11/1988 |
| JP | 05-168187 A | 7/1993 |
| JP | 2003-348780 A | 12/2003 |
| JP | 2004-031294 A | 1/2004 |

\* cited by examiner

*Primary Examiner*—Thanh Lam
(74) *Attorney, Agent, or Firm*—Foley & Lardner LLP

(57) ABSTRACT

A neutral-point terminal device for use with a neutral point side bundle of wires in a polyphase winding of a dynamo-electric machine includes a metal sleeve and an insulating cap covering the metal sleeve. The metal sleeve is covered by the insulating cap so that distal ends of the bundled neutral point side wires remain in an interior of the metal sleeve. The metal sleeve is then pressurized thereby to be deformed so as to be secured to the distal ends of the bundled wires.

7 Claims, 6 Drawing Sheets

NEUTRAL-POINT TERMINAL DEVICE FOR DYNAMOELECTRIC MACHINE

BACKGROUND OF THE INVENTION

1. Field of the Invention

The present invention relates to a neutral-point terminal device for a dynamoelectric machine for conductively bundling and connecting a plurality of neutral-point side wires of a polyphase winding in a polyphase dynamoelectric machine.

2. Description of the Related Art

There has recently been an extensive need for size reduction of dynamoelectric machines such as electric motors in the fields of transportation means including automotive vehicles or machine tools including industrial robots. For example, dynamoelectric machines having three-phase windings (polyphase windings) are used in electric vehicles including hybrid cars. In the electric vehicles, a capacity for provision of a dynamoelectric machine has been reduced with size reduction of the vehicle body. Accordingly, miniaturization in the dynamoelectric machine is an inevitable problem.

JP-A-2003-348780 discloses one of the aforesaid dynamoelectric machines, for example. The disclosed dynamoelectric machine comprises a rotor and a stator which further comprises a stator core and magnet wires wound on the stator core into three-phase windings. Neutral-point side wires of a three-phase winding to be Y-connected have respective distal ends which are combined together by a neutral-point terminal. The neutral-point terminal includes a metal sleeve into which neutral-point side wires of each phase winding are inserted into the neutral-point terminal in the state of a bundle. The metal sleeve is then pressurized thereby to be deformed such that the wire distal ends of the respective phases are conductively connected to the metal sleeve. An insulation cap is attached to the metal sleeve, so that a neutral-point terminal is completed. The neutral-point terminal device is generally disposed in an axially recessed portion (useless space) of a coil end of the stator winding protruding from both axial sides of the stator core, namely, a valley.

In order that the above-noted need for miniaturization may be satisfied, it is effective for miniaturization of the whole dynamoelectric machine to shape coil ends of the three-phase windings so that an axial dimension is reduced. For this purpose, axial pressure is usually applied by a shaping jig to coil ends of the stator winding protruding from both sides of the stator core. As a result, the coil ends are spread radially outward with respect to the stator core, whereby a shaping step reducing the axial dimension is carried out. Subsequently, a varnish insulating treatment is applied to the dynamoelectric machine. In the shaping step, the shaping jig applies an external force to the neutral-point terminal, so that an external force is applied by the shaping jig to the neutral-point terminal. As a result, the neutral-point terminal is pressed against a surface of each coil end and moved along the surface of each coil end.

In the conventional neutral-point terminal, the bundled neutral-point side wire distal ends are inserted through the metal sleeve, and the distal ends are sharpened as the result of wire cutting. The external force the shaping jig applies to the neutral-point terminal causes the sharp edges to break through the insulating cap. As a result, insulation failure occurs and in a worst case, an enamel layer on the surface of the magnet wire is stripped off such that short circuit would occur.

SUMMARY OF THE INVENTION

Therefore, an object of the present invention is to provide a neutral-point terminal device for a dynamoelectric machine, which can prevent insulation failure at the neutral point side at the step of shaping the coil end of the stator winding and further can prevent the magnet wire from being damaged by the neutral terminal.

The present invention provides a neutral-point terminal device provided on a neutral point side bundle of wires in a polyphase winding of a dynamoelectric machine. The neutral-point terminal device comprises a metal sleeve and an insulating cap covering the metal sleeve, wherein the metal sleeve is covered by the insulating cap so that distal ends of the bundled neutral point side wires remains in an interior of the metal sleeve, the metal sleeve being then pressurized thereby to be deformed so as to be secured to the distal ends of the bundled wires.

Since the metal sleeve is covered by the insulating cap so that the distal ends of the bundled neutral point side wires remain in the interior of the metal sleeve, the insulating cap can be prevented from being broken by the distal ends of the bundled wires at a step of shaping coil ends.

The invention also provides a neutral-point terminal device provided on a neutral point side bundle of wires in a polyphase winding of a dynamoelectric machine. The neutral-point terminal device comprises a metal sleeve, a first insulating cap covering the metal sleeve and a second insulating cap covering the first insulating cap, wherein the metal sleeve is covered by the first insulating cap so that distal ends of the bundled neutral point side wires remains in an interior of the metal sleeve, the metal sleeve being then pressurized thereby to be deformed so as to be secured to the distal ends of the bundled wires.

The distal ends of the bundled neutral point side wires may extend through the metal sleeve or remain in the interior of the metal sleeve. Since a dual insulating structure is provided by the first and second insulating caps, insulation failure by the distal ends of the bundled neutral point side wires can be prevented at a step of shaping coil ends.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
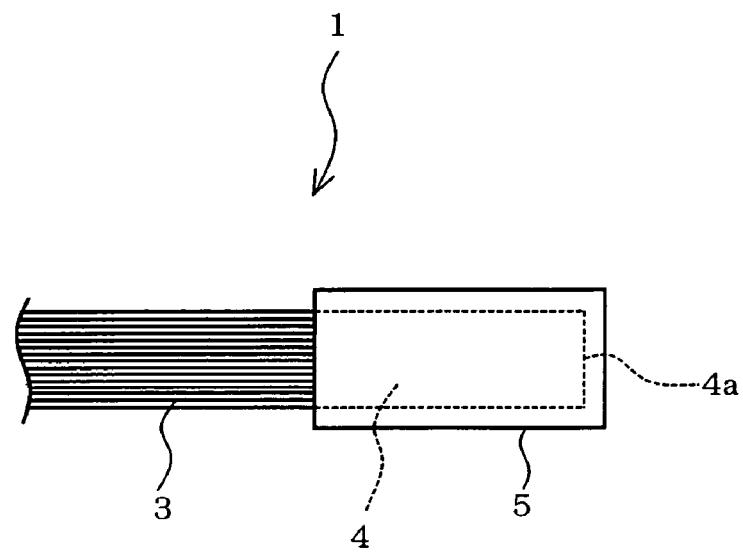
FIG. 1 is a side view of a neutral terminal employed in a first embodiment of the present invention.

A first embodiment of the present invention will be described with reference to FIGS. 1 to 4. Referring to FIG. 1, for example, 54 neutral-point side wires 3 are drawn out of three-phase winding 2 of a dynamoelectric machine (see FIG. 4). The neutral-point side wires 3 have respective distal ends 4. A cylindrical metal sleeve 5 is made of copper and has two open ends. The distal ends 4 of the neutral-point side wires 3 are bundled and inserted into one of the open ends of the metal sleeve 5. The metal sleeve 5 is then pressurized thereby to be deformed, so that the neutral-point terminal 1 is formed. Consequently, the metal sleeve is secured or crimped to the bundle of the neutral-point side wires 3. In this case, the neutral-point side wires 3 and the metal sleeve 4 are positioned so that cut edges 4a of the distal ends of the neutral-point side wires 3 remain in an interior of the metal sleeve 5 according to the object of the invention, and thereafter, the aforesaid securement is executed.

Figure 3:
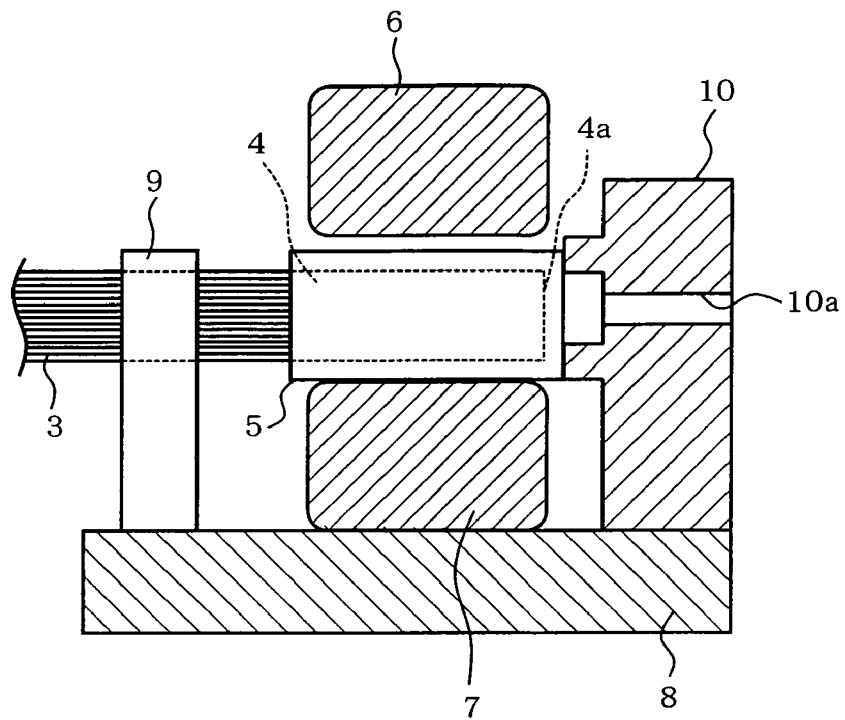
FIG. 3 is a longitudinal section of an apparatus for crimping a metal sleeve to neutral point side wires.
Figure 4:
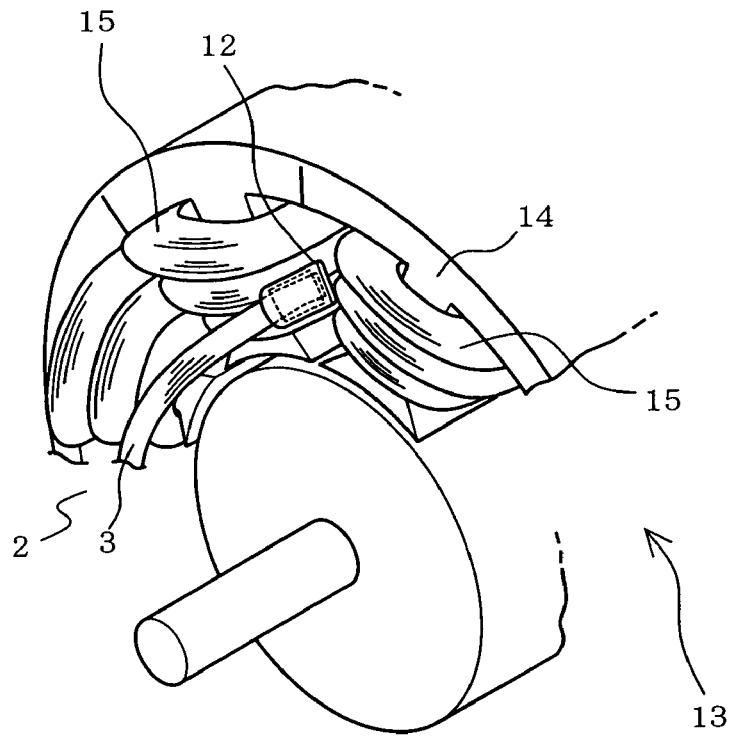
FIG. 4 is a broken perspective view of a part of a dynamoelectric machine in the vicinity of coil ends.
Figure 5:
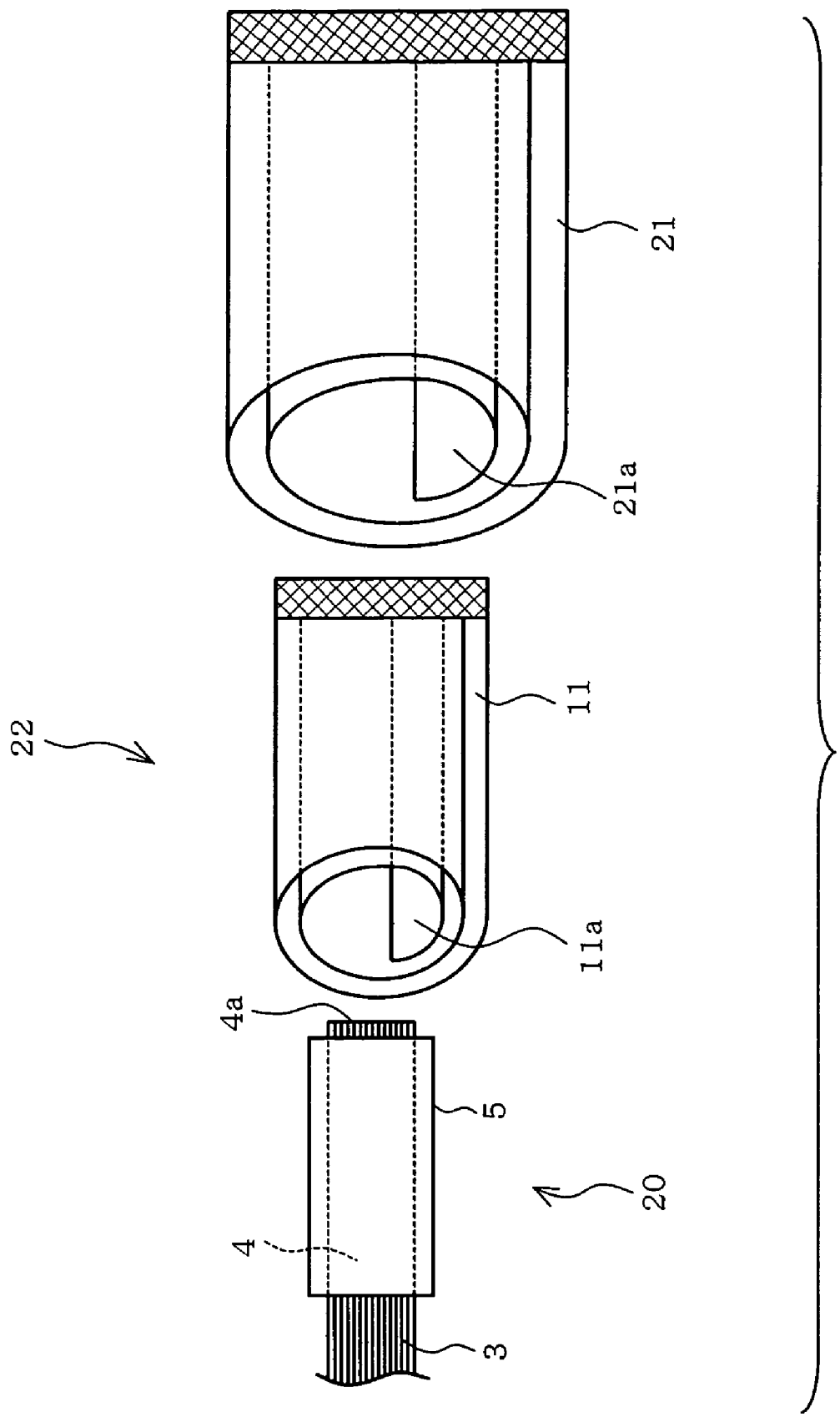
FIG. 5 is a view similar to FIG. 2, showing a second embodiment of the invention.

The securing step will now be described. As shown in FIG. 3, the cut distal ends 4 of the bundled neutral-point side wires 3 are inserted into the interior of the metal sleeve 5 in a bundled state as shown in FIG. 3. A bundle of the wires 3 is fixed to a fixing jig 9 disposed on a base 8 together with a positioning jig 10. In this case, a part of one end of the metal sleeve 4 abuts against the positioning jig 10 so that a relative positional relation between the metal sleeve 4 and the neutral-point side wires 3 is determined. As a result, the metal sleeve 4 and the neutral-point side wires 3 are positioned so that the cut edges 4a of the distal ends of the neutral-point side wires 3 remain in the interior of the metal sleeve 5 without extending through the metal sleeve 4.

Subsequently, the metal sleeve 5 is held between upper and lower electrodes 6 and 7 installed on the base 8, thereby being pressurized. Simultaneously, current of, for example, 12 kA is caused to flow through the metal sleeve 5 so that the metal sleeve 5 is heated to about 600° C. by electrical resistance heating. Consequently, enamel layers on surfaces of magnet wires constituting the neutral-point side wires 3 are burnt to be removed, whereupon copper cores of the magnet wires are rendered conductive therebetween and the metal sleeve 5 and the copper cores of the magnet wires are rendered conductive therebetween.

In the aforesaid crimping, a small amount of smoke resulting from the burning of the enamel layers is discharged outside through one end of the metal sleeve 5 in abutment with the positioning jig 10 and a smoke discharge hole 10a formed in the positioning jig 10.

Figure 2:
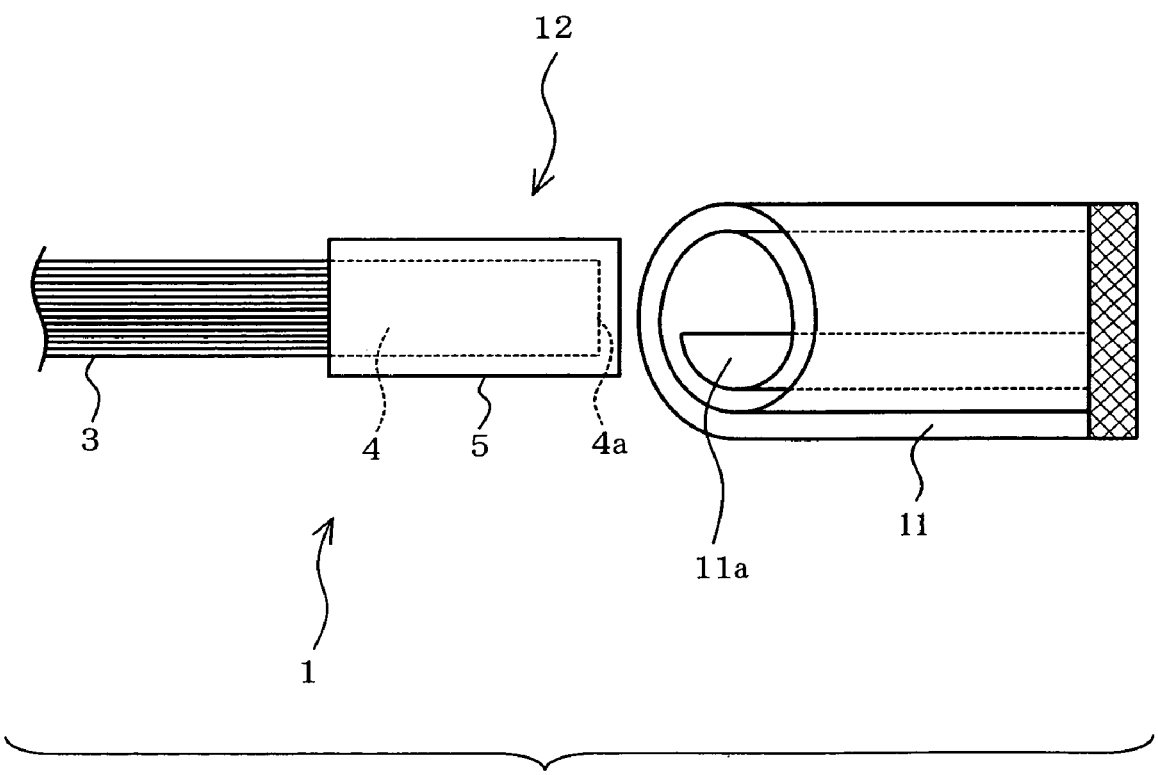
FIG. 2 is a side view of the neutral terminal and an insulating cap both employed in the first embodiment.

An insulating cap 11 is adapted to cover the metal sleeve 5 of the neutral-point terminal 1 as shown in FIG. 2. The insulating cap 11 is made by rolling an insulating paper such as aramid paper a plurality of turns into a cylindrical shape. The insulating cap 11 has an open end which is collapsed into a flat shape and closed by deposition by means of ultrasonic irradiation or bonding by means of bonding agent. The insulating cap 11 has the other end having an opening 1a. The neutral-point terminal 1 is inserted through the opening 11a into the interior of the metal sleeve 5, whereby a neutral-point terminal device 12 is completed.

The neutral-point terminal device 12 thus configured is disposed in a valley between adjacent coil ends 15 of the three-phase winding 2 in a stator 14 of a dynamoelectric machine 13 such as an electric motor. Subsequently, the stator 14 is transferred to a shaping step in which coil ends 15 are spread and a step of applying varnish insulation treatment to the whole winding 2 in turn. As the result of the varnish insulation treatment, the metal sleeve 5 and the insulating cap 11 are inseparably joined together.

According to the foregoing embodiment, the metal sleeve 4 and the neutral-point side wires 3 are positioned so that the cut edges 4a of the distal ends of the neutral-point side wires 3 remain in the interior of the metal sleeve 5 without projecting out of the metal sleeve. Accordingly, even when an external force is applied to the coil end 15 by the shaping jig in the spreading step, the sharp cut edges 4a can be prevented from breaking through the insulating cap 11 or stripping off an enamel layer on the surface of the magnet wire.

Furthermore, the cut edges 4a of the distal ends 4 of the neutral-point side wires 3 are positioned relative to the metal sleeve 5 using the fixing and positioning jigs 9 and 10 so that the distal ends 4 are non-projecting out of the metal sleeve. Consequently, a plurality of neutral-point terminals 1 with the same quality can be formed accurately and readily.

Second to seventh embodiments will be described with reference to FIGS. 5 to 11. In FIGS. 5 to 11, identical or similar parts are labeled by the same reference symbols as those in FIG. 2 and the description of these parts will be eliminated. The second embodiment of the invention will now be described with reference to FIG. 5. The distal ends 4 of the neutral-point side wires 3 extend through the metal sleeve 5, whereupon the distal ends are in a projecting state. However, the neutral-point terminal 20 is covered by the insulating cap 11 which is further covered by an outer insulating cap 21 having a size larger than the insulating cap 11 and having an opening 21a. Thus, a neutral-point terminal device 22 with two (a plurality of) insulating caps lying one upon the other is completed.

Even if the inner insulating cap 11 is broken by the cut edges 4a of the distal ends 4 of the neutral-point side wires 3, the outer insulating cap 21 can serve to maintain insulation of the neutral-point terminal 20. Consequently, breakage of the inner insulating cap 11 can be prevented from leading directly to a short circuit, and accordingly, the insulation performance of the neutral-point terminal 20 can be improved.

Figure 6:
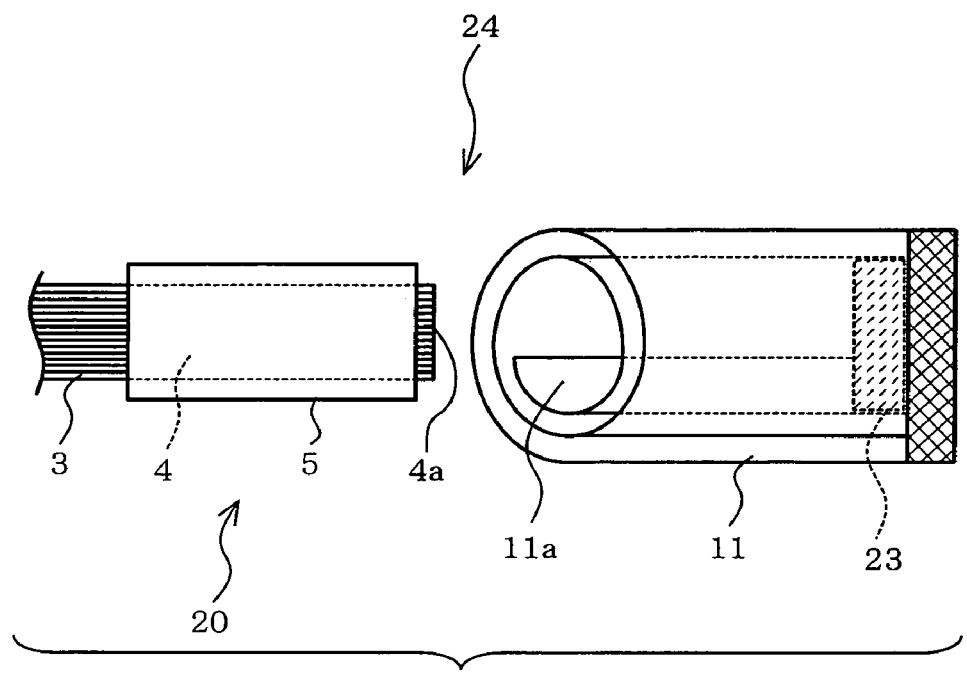
FIG. 6 is a view similar to FIG. 2, showing a third embodiment of the invention.

FIG. 6 illustrates a third embodiment of the invention. In the third embodiment, the insulating cap 11 includes a generally pad-like auxiliary insulator 23 made of rubber, for example. The auxiliary insulator 23 is accommodated in the distal-end side of the interior of the insulating cap 11. The insulating cap 11 accommodating the auxiliary insulator 23 is attached to the metal sleeve 5 so as to cover the metal sleeve, whereby a neutral-point terminal device 24 is completed. In this case, the cut edges 4a of the distal ends 4 abut against the auxiliary insulator 23 but not directly against the distal end or the bottom of the insulating cap 11. Consequently, since the insulating cap 11 is prevented from being broken, the insulation performance of the neutral-point terminal 20 can be improved.

Figure 7:
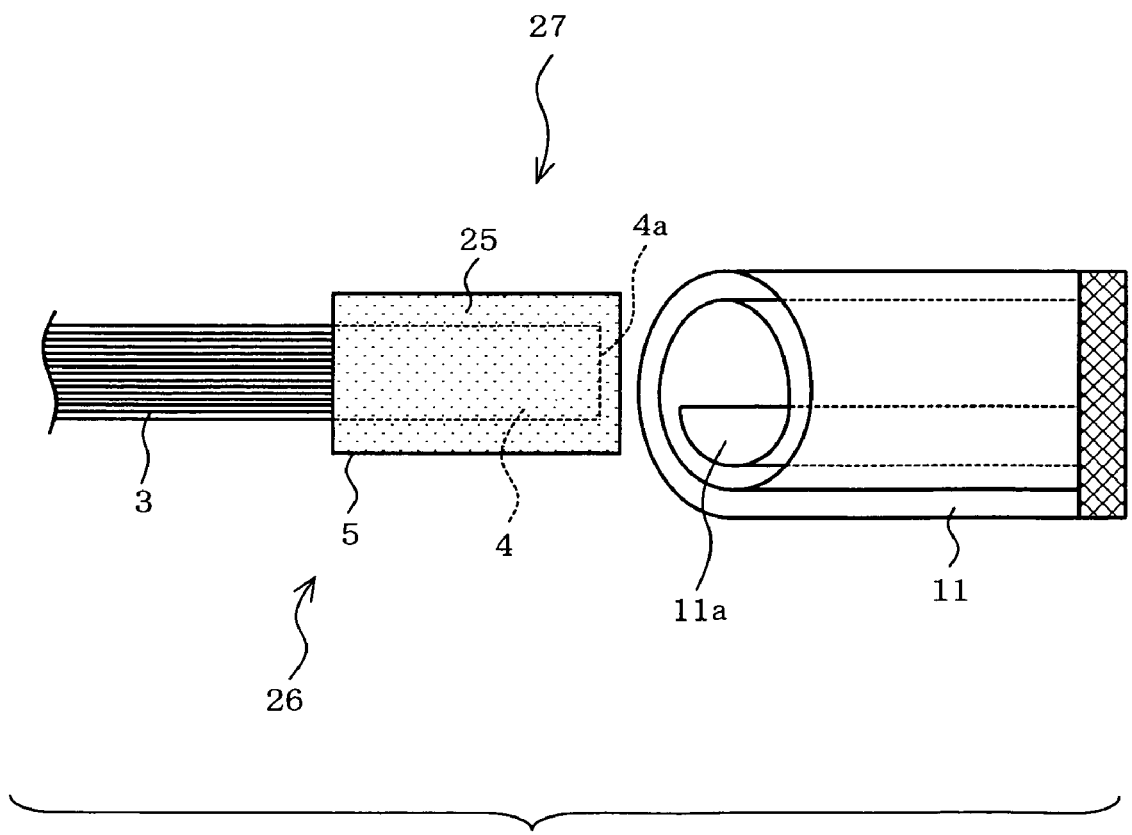
FIG. 7 is a view similar to FIG. 2, showing a fourth embodiment of the invention.

FIG. 7 illustrates a fourth embodiment of the invention. In the fourth embodiment, an insulating tape 25 is wound on the outer periphery of the metal sleeve 5 of the neutral-point terminal 20. Thereafter, the insulating cap 11 is caused to cover the insulating tape 25 on the metal sleeve 5, whereby a neutral-point terminal device 27 is completed.

Figure 8:
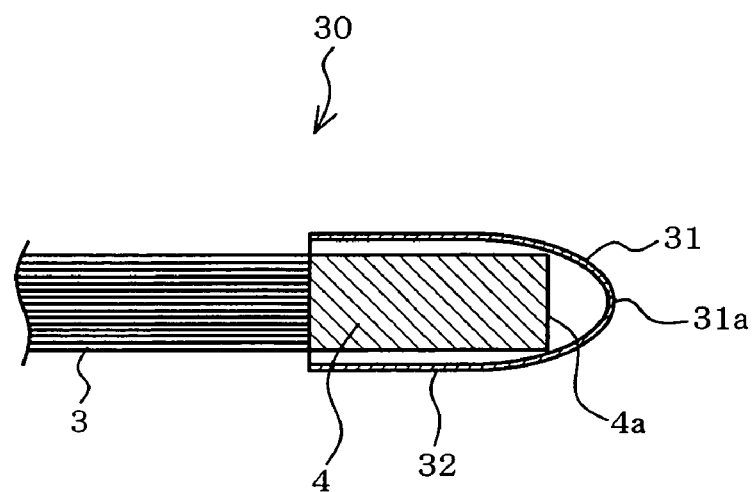
FIG. 8 is a longitudinal section of the neutral terminal employed in a fifth embodiment of the present invention.
Figure 9:
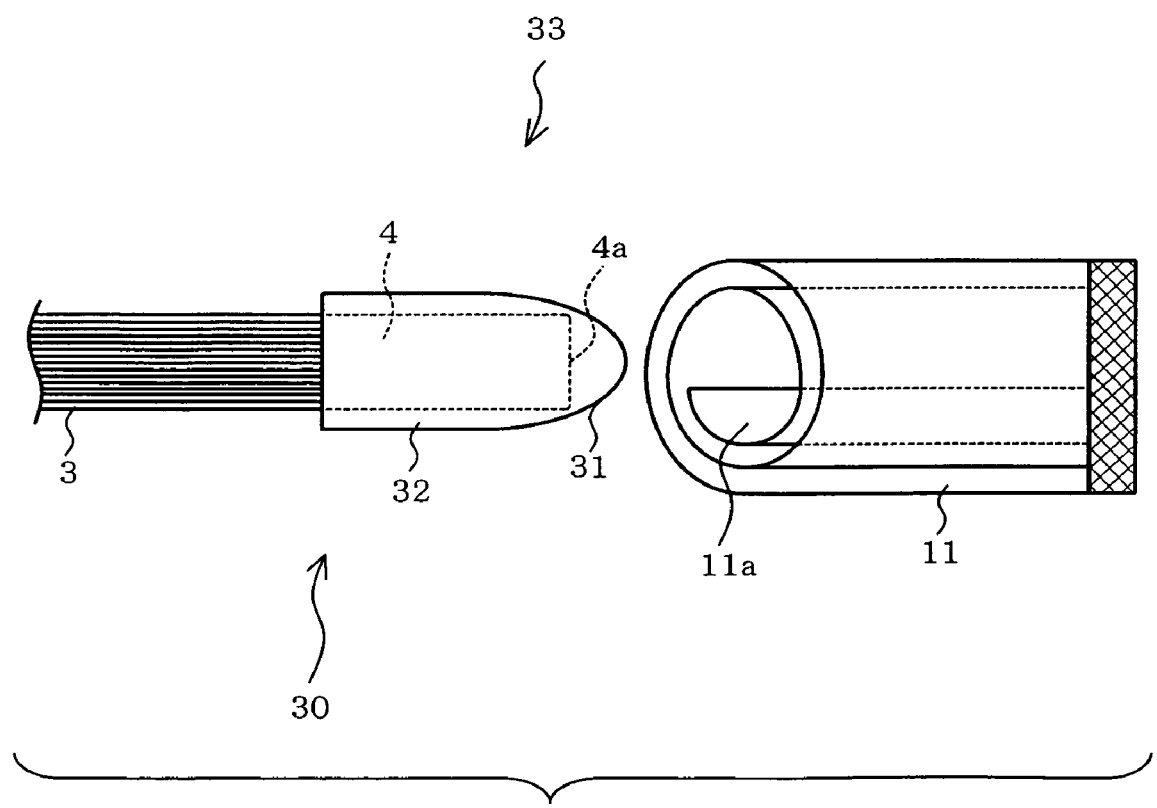
FIG. 9 is a view similar to FIG. 2, showing the fifth embodiment.

FIGS. 8 and 9 illustrate a fifth embodiment of the invention. The neutral-point terminal 30 includes a bottomed cylindrical metal sleeve 32 having an end formed with a dome 31, instead of the metal sleeve 5 with two open ends.

The metal sleeve 32 and the bundle-shaped distal ends 4 inserted into the metal sleeve are presented as the sectional views in FIG. 8. Smoke produced in the metal sleeve 32 as the result of the crimping of the neutral-point side wires 3 is discharged through a hole 31a formed through the dome 31. Thereafter, the insulating cap 11 is caused to cover the neutral-point terminal 30, whereby a neutral-point terminal device 33 is completed.

Figure 10:
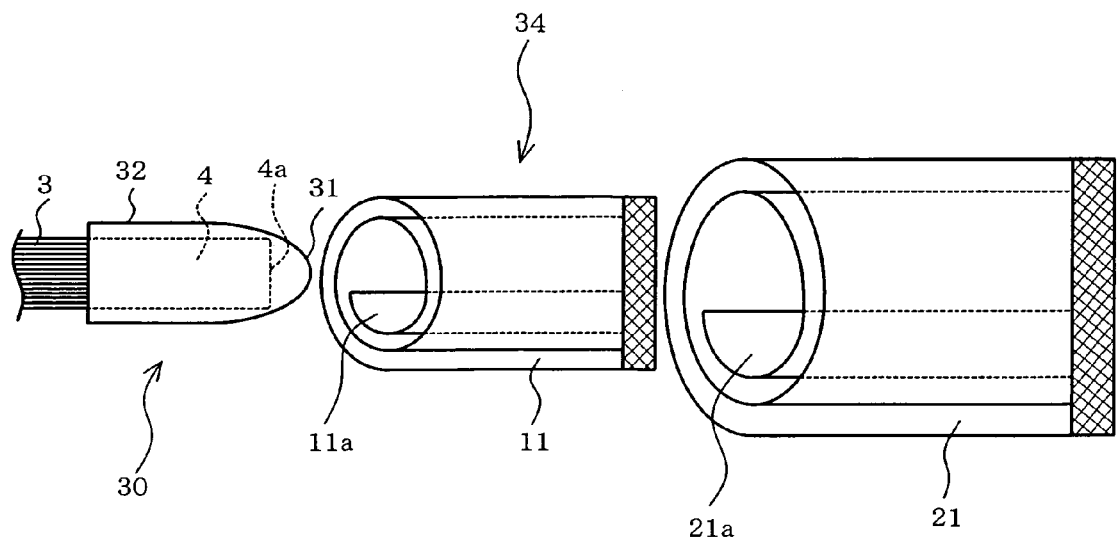
FIG. 10 is a view similar to FIG. 2, showing a sixth embodiment of the invention.

FIG. 10 illustrates a sixth embodiment of the invention. In the sixth embodiment, the neutral-point terminal 30 is covered by the insulating cap 11 which is further covered by the outer insulating cap 21 having a size larger than the insulating cap 11 and having an opening 21a. Thus, a neutral-point terminal device 34 with two insulating caps is completed.

Figure 11:
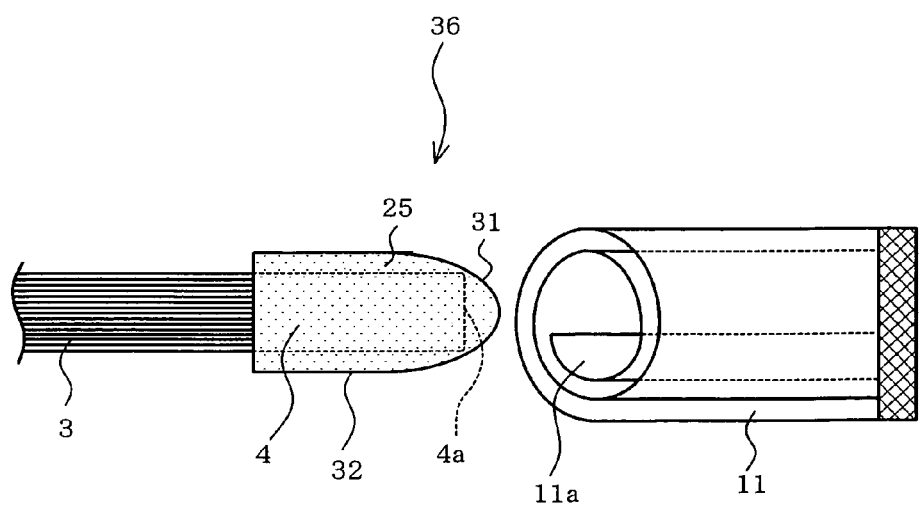
FIG. 11 is a view similar to FIG. 2, showing a seventh embodiment of the invention.

FIG. 11 illustrates a seventh embodiment of the invention. In the seventh embodiment, the insulating tape 25 is wound on the outer periphery of the metal sleeve 32 of the neutral-point terminal 30. Thereafter, the insulating cap 11 is caused to cover the insulating tape 25 on the metal sleeve 32, whereby a neutral-point terminal device 36 is completed.

Each of the foregoing embodiments employs an electrical crimp as a method of securing the neutral-point side wires 3 to the metal sleeve 5 or 32. The electrical crimp includes steps of electric heating and pressurization. However, the securing method should not be limited to the aforesaid electrical crimp. For example, a mechanical crimp may be employed instead. In the mechanical crimp, enamel layers of the magnet wire distal ends are mechanically stripped off in advance. Crimping is carried out in this state. The electric heating may be eliminated in the mechanical crimp. This method is advantageous when the number of magnet wires is small.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A neutral-point terminal device provided on a neutral-point side bundle of wires in a polyphase winding of a dynamoelectric machine, the neutral-point terminal device comprising a metal sleeve and an insulating cap covering the metal sleeve, wherein the metal sleeve is covered by the insulating cap so that distal ends of the bundled neutral point side wires remain in an interior of the metal sleeve, the metal sleeve being then pressurized thereby to be deformed so as to be secured to the distal ends of the bundled wires.

2. The neutral-point terminal device according to claim 1, further comprising another outer insulating cap covering the insulating cap.

3. The neutral-point terminal device according to claim 1, further comprising an auxiliary insulator accommodated in the distal end side interior of the insulating cap.

4. The neutral-point terminal device according to claim 1, wherein the metal sleeve has an outer periphery on which an insulating tape is wound so as to surround the outer periphery of the metal sleeve.

5. A neutral-point terminal device provided on a neutral point side bundle of wires in a polyphase winding of a dynamoelectric machine, the neutral-point terminal device comprising a metal sleeve, a first insulating cap covering the metal sleeve and a second insulating cap covering the first insulating cap, wherein the metal sleeve is covered by the first insulating cap so that distal ends of the bundled neutral point side wires remain in an interior of the metal sleeve, the metal sleeve being then pressurized thereby to be deformed so as to be secured to the distal ends of the bundled wires.

6. A neutral-point terminal device provided on distal ends of bundled neutral-point side wires in a polyphase winding of a dynamoelectric machine, the neutral-point terminal device comprising a metal sleeve through which the distal ends of the bundled neutral-point side wires are inserted, an insulating cap which covers the metal sleeve and the distal ends of the bundled neutral-point side wires so as to surround the metal sleeve and the distal ends of the bundled neutral-point side wires, and an outer insulating cap covering the insulating cap, wherein the metal sleeve is pressurized thereby to be deformed so as to be secured to the distal ends of the bundled neutral-point side wires.

7. The neutral-point terminal device according to claim 6, further comprising an auxiliary insulator accommodated in the distal end side interior of the insulating cap.

* * * * *